US012693478B2

(12) United States Patent
Carneiro Lopes et al.

(10) Patent No.: US 12,693,478 B2
(45) Date of Patent: Jul. 28, 2026

(54) REINFORCED OPTICAL CABLE CONNECTOR

(71) Applicant: Furukawa Electric Latam S.A., Curitiba (BR)

(72) Inventors: Marcela Carneiro Lopes, Curitiba (BR); Thiago Deconto Vieira, Curitiba (BR); Renato Flávio Cruz, Curitiba (BR); Lucas Gabriel Chaves, Curitiba (BR)

(73) Assignee: Furukawa Electric Latam S.A., Curitiba (BR)

( * ) Notice: Subject to any disclaimer, the term of this patent is extended or adjusted under 35 U.S.C. 154(b) by 283 days.

(21) Appl. No.: 18/265,515

(22) PCT Filed: Aug. 12, 2022

(86) PCT No.: PCT/BR2022/050315
§ 371 (c)(1),
(2) Date: Jun. 6, 2023

(87) PCT Pub. No.: WO2023/028674
PCT Pub. Date: Mar. 9, 2023

(65) Prior Publication Data
US 2024/0027693 A1     Jan. 25, 2024

(30) Foreign Application Priority Data
Sep. 1, 2021   (BR) ........................... 1020210173963

(51) Int. Cl.
*G02B 6/38*          (2006.01)
(52) U.S. Cl.
CPC .......... *G02B 6/387* (2013.01); *G02B 6/3825* (2013.01); *G02B 6/3831* (2013.01); *G02B 6/3857* (2013.01); *G02B 6/3877* (2013.01)

(58) Field of Classification Search
None
See application file for complete search history.

(56) References Cited

U.S. PATENT DOCUMENTS 6,068,410 A * 5/2000 Giebel ................. G02B 6/3846
385/98
6,120,193 A * 9/2000 Luther ................. G02B 6/3801
385/99

(Continued)

FOREIGN PATENT DOCUMENTS

WO    WO 2013/021294    2/2013
WO    WO 2019/005195    1/2019
WO    WO 2020/167779    8/2020

OTHER PUBLICATIONS

Informe Pericial y Informe de Búsqueda [Opinion and Search Report] Dated Apr. 16, 2025 From the Ministeriode Economia, Fomento y Turismo, INAPI, Gobierno de Chile Re. Application No. 202400620. (14 Pages).

(Continued)

*Primary Examiner* — Chris H Chu

(57) ABSTRACT

The present invention relates to a reinforced optical cable connector comprising an inner body for housing an optical cable, the inner body comprising a plug holder for securing a connection plug at a first end; a crimping base comprising a retaining sleeve for retaining the optical cable; and an outer housing for housing the inner body, the crimping base; wherein the crimping base comprises a fastener for engagement with the inner body; and the inner body comprises a mating surface at a second end opposite the first end for attaching the crimping base fastener.

24 Claims, 11 Drawing Sheets

(56) References Cited

U.S. PATENT DOCUMENTS

| | | | | |
|---|---|---|---|---|
| 7,708,469 | B2 * | 5/2010 | Liu | G02B 6/3833 |
| | | | | 385/66 |
| 9,205,610 | B1 * | 12/2015 | Danley | G02B 6/2552 |
| 10,830,967 | B2 * | 11/2020 | Pimentel | G02B 6/3893 |
| 2007/0036487 | A1 | 2/2007 | Grzegorzewska et al. | |
| 2013/0322826 | A1 * | 12/2013 | Henke | G02B 6/3869 |
| | | | | 385/60 |
| 2018/0031773 | A1 | 2/2018 | Ohtsuka et al. | |

OTHER PUBLICATIONS

Supplementary European Search Report and the European Search Opinion Dated Oct. 10, 2024 From the European Patent Office Re. Application No. 22862445.8. (10 Pages).
Relatório de Pesquisa Internacional e Opinião Escrita [International Search Report and the Written Opinion] Dated Nov. 7, 2022 From the International Searching Authority Re. Application No. PCT/BR2022/050315 and Its Translation of Search Report Into English. (31 Pages).

* cited by examiner

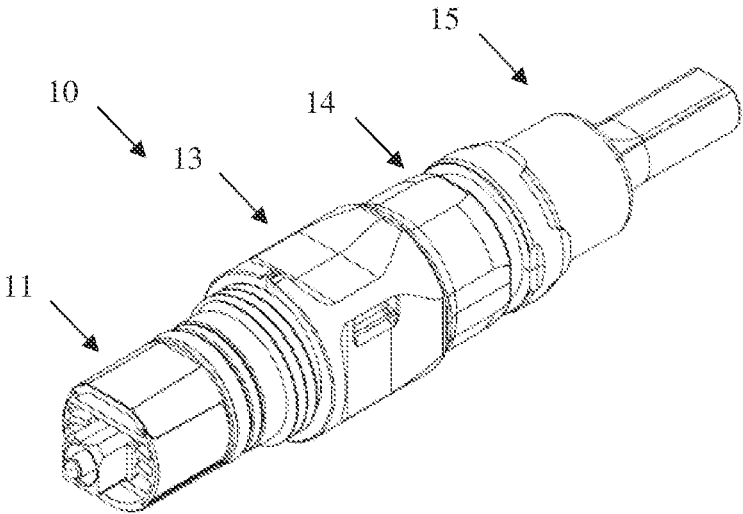
Figure 1.a
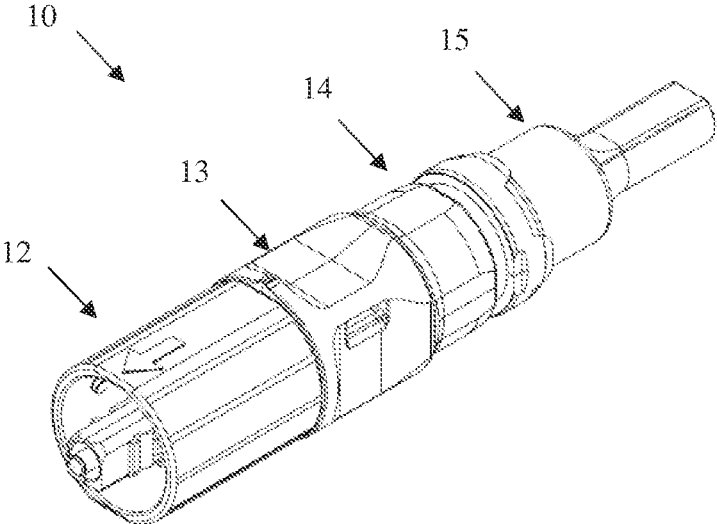
Figure 1.b

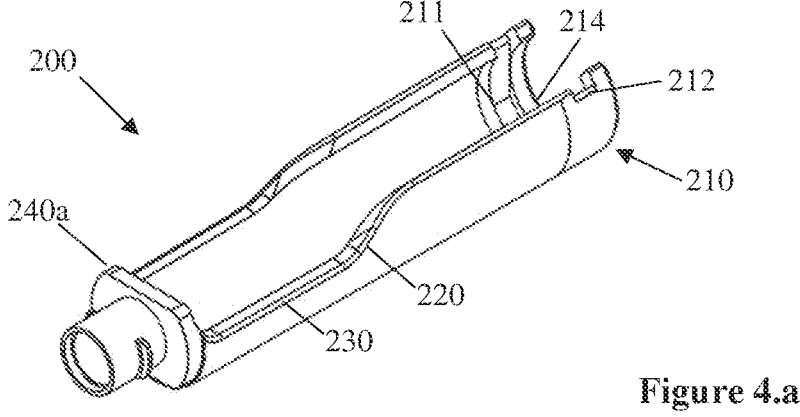
Figure 4.a
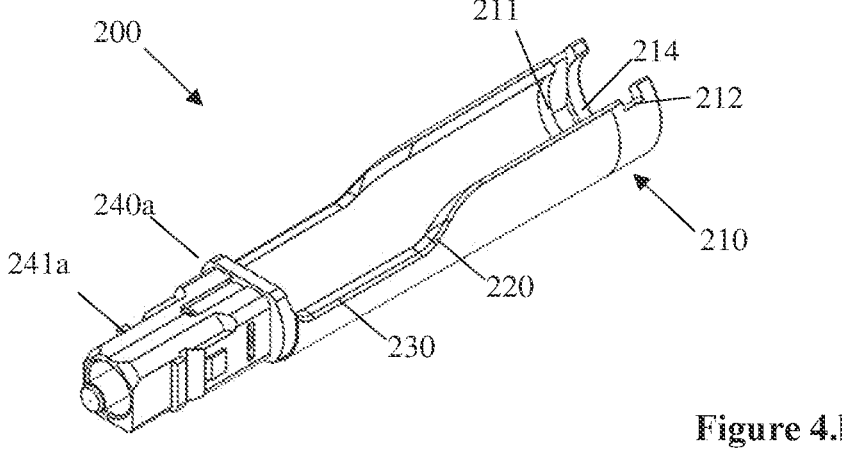
Figure 4.b

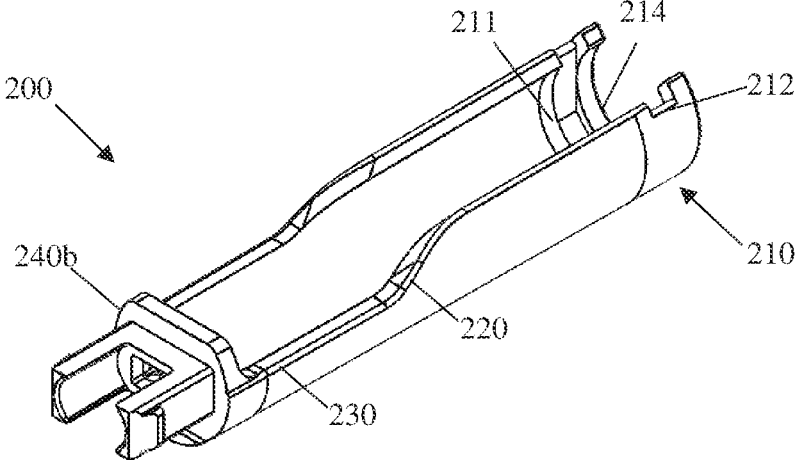
Figure 5.a
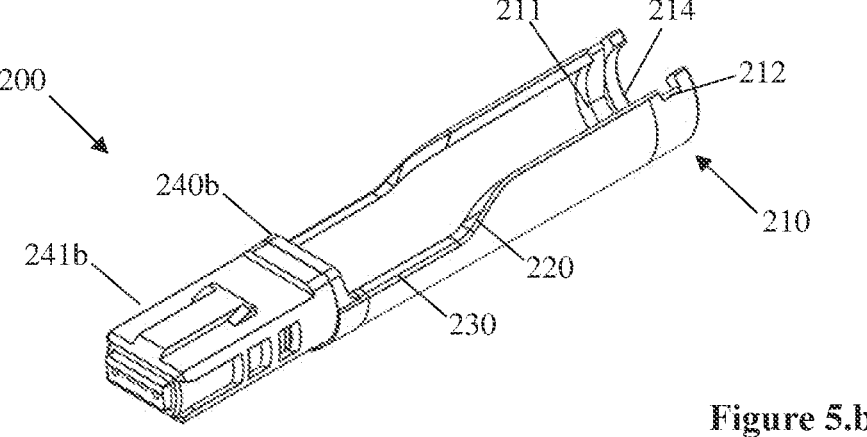
Figure 5.b

REINFORCED OPTICAL CABLE CONNECTOR

RELATED APPLICATIONS

This application is a National Phase of PCT Patent Application No. PCT/BR2022/050315 having International filing date of Aug. 12, 2022, which claims the benefit of priority of Brazil Patent Application No. 1020210173963 filed on Sep. 1, 2021. The contents of the above applications are all incorporated by reference as if fully set forth herein in their entirety.

FIELD AND BACKGROUND OF THE INVENTION

The present invention relates to a reinforced optical cable connector comprising an optical cable crimping system that features increased robustness.

Fiber optic connectors are used in fiber optic communications systems to make the connection between optical cables, between an optical cable and an optical component, or between optical and electrical components. The fiber optic connector must correctly interconnect the end faces of two optical fibers that need to be connected to achieve maximum power transmission through the fibers. For this, the connection between the fibers must be precise and stable.

The reinforced connector is installed in optical termination boxes, which have outputs with reinforced adapters. The coupler is attached to the internal thread of the reinforced adapter, following the alignment indicated by the shape of the ferrule. Inside the box and at the other end of the reinforced adapter there are different connector patterns, such as SC, MPO and others, forming the connection for optical signal transfer.

In view of this, the state of the art presents a variety of solutions aimed at providing fiber optic connectors, reinforced, pre-terminated or pre-connectorized, in order to improve connection stability, protection of fiber optic cables, in addition to facilitating installation in the field.

WO2018023837A1 describes a fiber optic connector comprising a multifiber fiber optic adapter assembly and a shield assembly that is coupled to the multifiber fiber optic adapter assembly. The fiber optic adapter assembly comprises a cable-back protective sleeve, a base into which the protective sleeve is inserted, a pre-terminated multi-fiber fiber optic adapter that attaches to the base, and a first protective housing that is coated into the pre-terminated fiber optic adapter and plugs into the base. The protective assembly comprises an internal support and fastening element, a connecting element and a second protective housing, the internal support and tightening element being provided within the second protective housing, the connecting element being provided within the second housing of protection and with glove in the internal element of support and tightening.

WO9313442A1 describes a fiber optic connector that includes a bolt assembly with a fiber inside a tube, where an internal spring pushes the bolt and hub out of the tube. A nut is movably attached to the barrel. An external spring tilts the cylinder toward one end of a compartment connector. For proper attachment to the fiber optic cable, a retaining clip is provided so as to cooperate with the housing to perform the crimping of the connector with the optical cable.

US20170261700A1 describes a crimp connector for increasing the pull retention of an optical cable in a fiber optic connector assembly housing. The connector has a flange to engage with the housing and crimp member to engage with the optical cable. The connector assembly comprises a retaining device comprising a T-component and a crimping ring that fits around the retaining device, both being of metallic material. The crimping ring, presented as a cylinder ring, has teeth for retention in the cable.

As exposed above, some solutions to the problems related to the connectorization of fiber optic cables are found in the state of the art. However, the state of the art still lacks a solution where the reinforced connector ensures a strong and stable connection, having a "plug-and-play" function, which facilitates and speeds up the installation of networks and with greater robustness of the assembly due to the conformation of the crimping system. In addition, the state of the art does not present a connector with a crimping system that offer greater versatility for connectorizing different types of bolt (such as SC, MPO, LC, among others) and different cable formats and constructions, making compatibility wide for different applications, with cables of one fiber or up to 24 fibers or more, cables with metallic traction elements, dielectrics, aramid, among others.

Thus, there is a need for an advantageous solution that provides greater robustness for a reinforced optical cable connector with a conformation that improves connection stability and performance in bad weather, with greater internal spacing, relieving tension in the fibers during dimensional variations caused by exposure to temperature. In addition, it is necessary to provide an optical fiber connector that has an internal body fitting available for plugs of optical cables of the SC monofiber type, MPO multifiber and/or hybrid cables, using the same components and improving productivity, reducing the number of components.

SUMMARY OF THE INVENTION

The objective of the present invention is to provide a reinforced optical cable connector with greater robustness with a crimping base with a better cable fixation and that can be installed in an agile and practical way.

In order to achieve the objectives described above, the present invention provides a reinforced optical cable connector comprising an inner body for housing an optical cable comprising at least one optical fiber, wherein the inner body comprises a plug holder for fastening a connecting plug at a first end; a crimping base comprising a retaining sleeve for retaining the optical cable; and an outer housing for housing the inner body, the crimping base; wherein the crimping base comprises a fastener for engagement with the inner body; and the inner body comprises a mating surface at a second end opposite the first end for fastener the crimping base fastener.

BRIEF DESCRIPTION OF THE SEVERAL VIEWS OF THE DRAWINGS

The present invention will be better understood from the detailed description with reference to the Figures described below.

FIGS. 1.*a* and 1.*b* illustrate a reinforced optical cable connector according to an embodiment of the present invention.

FIGS. 4.*a* and 4.*b* illustrate an internal body according to an embodiment of the present invention.

FIGS. 5.*a* and 5.*b* illustrate an internal body according to an embodiment of the present invention.

DESCRIPTION OF SPECIFIC EMBODIMENTS OF THE INVENTION

Figure 2:
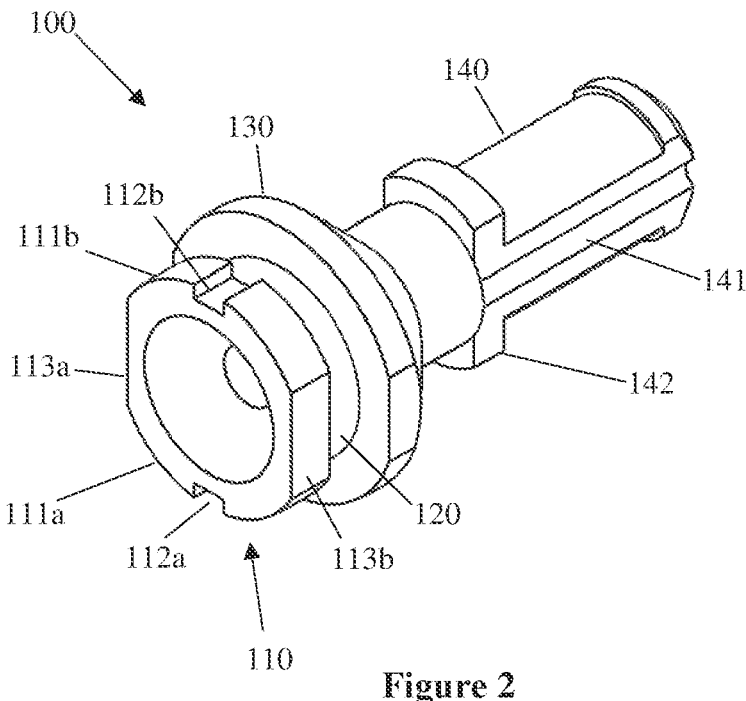
FIG. 2 illustrates a crimping base according to an embodiment of the present invention.

The description that follows will depart from a preferred embodiment of the invention, applied to a reinforced optical cable connector as illustrated in the Figures. It should be noted that some of the pictures do not show the optical cable for simplification. However, as will be evident to anyone skilled in the art, the invention is not limited to a particular embodiment, nor is it to a reinforced optical cable connector comprising an inner body for housing an optical cable comprising at least one optical fiber, wherein the body inner comprising a plug holder for securing a connecting plug to a first end; a crimping base comprising a retaining sleeve for retaining the optical cable; and an outer housing for housing the inner body, the crimping base; wherein the crimping base comprises a fastener for engagement with the inner body; and the inner body comprises a mating surface at a second end opposite the first end for attaching the crimping base fastener.

FIG. 1.*a* illustrates a reinforced connector 10 assembled according to an embodiment of the present invention for connecting optical fiber. As can be seen, the connector is presented with a monofiber optical fiber, but as will be clarified later, the present invention is not limited to a specific type of optical fiber.

Connector 10 consists of a reinforced housing that stores an optical cable internally, providing protection and enabling its connection. Optical cable comprises at least one optical fiber for optical data transmission. According to the present invention, different optical fiber embodiments can be used as single-fiber optical fiber cables, which comprise only one optical fiber, or multifiber, which comprise a plurality of optical fibers, such as 12 or 24 optical fibers per cable. Additionally, optical cable can be a hybrid cable that comprises, in addition to at least one optical fiber, metallic electrical conductors for power or data transmission.

The optical fiber connector housing 10, according to the illustrated embodiment, comprises an outer housing 13 comprising fastening elements, such as threads, and a cable gland 14.

In addition, the fiber optic connector 10 comprises a compatibility ferrule 11 for performing coupling with a fiber optic adapter or an optical element having a corresponding shape. Compatibility ferrules 11 fit into the reinforced body, at the end of the bolt side, also providing protection to prevent damage to the bolt during handling, as well as ensuring alignment of the connection on the adapter. The compatibility ferrule 11 can be made integral with the fiber optic connector housing 10.

Preferably, the compatibility ferrule 11 is a part that can be attached to the housing of the fiber optic connector 10, either by means of coupling, threads, or a combination thereof. This form of usage makes it possible to make the same reinforced optical cable 10 connector housing compatible for different types, such as monofiber or multifiber, and to use ferrules and auxiliary parts for compatibility with different models of fiber optic connector adapters or translators. That is, the connection of the same fiber of a connector 10 can be performed in different models of fiber optic adapters or couplers by an operator simply replacing the compatibility ferrule with another one with a suitable format.

According to the example in FIG. 1.*a*, the compatibility ferrule 11 is attached by means of threads present at the end near the connector plug 10. FIG. 1.*b* illustrates connector 10 from FIG. 1.*a*, but with a matching ferrule 12 that has a different shape and is suitable for a different adapter model. In addition, the compatibility ferrule 12 has a different attachment that is made on the coupling threads of the outer housing 13.

In this way, the fiber optic connector housing 10 allows the connection and also the protection of the optical fiber inside. The optical cable is fixed and retained inside the reinforced optical cable connector 10 by means of a crimping system that will be described next.

FIG. 2 illustrates a crimping base 100 for securing an optical cable according to an embodiment of the present invention. The crimping base 100 has a tapered body 130, a fastener 110, and a neck 120 formed between them. The crimping base 100 comprises a central hole where the optical cable is inserted during manufacturing. Furthermore, the crimping base 100 comprises a retaining sleeve 140 with side openings 141, like channels, for attaching optical cable pulling elements to keep the optical cable 180 retained next to the fiber optic connector 10. The tensile elements of the optical cable are either aramid, wire rope, or steel wire. Thus, the optical cable 180 will remain fixed relative to the fiber optic connector 10, for example, when the assembly is moved for connecting or disconnecting the optical fiber in a coupler or adapter.

The fastener 110 is arranged to secure the crimping base 100 to an internal body comprising fiber optic connection elements. According to an embodiment of the present invention, the fastener 110 is formed by a protruding edge projecting from the end of the crimping base 110 opposite the retaining sleeve 140. Preferably, the fastener has two arc-shaped mating edges 111*a*, 111*b*. Optionally, the snap-in edges 111*a*, 111*b* can have notches 112*a*, 112*b* for fitting fastening elements of the inner body and outer housing of the fiber optic connector 10. Further, the fastener 110 comprises side engaging faces 113*a*, 113*b* that extend forming an angled region near each of the engaging edges 111*a*, 111 *b*. Thus, the fastener 110 has a specific shape to fit into a region of compatible shape for fixing the crimping base 100 of the fiber optic connector 10.

Preferably, the crimping base 100 is made of metallic material suitable for retaining the optical cable. In addition, the tapered body 130, the neck 120, the fastener 110, and the retaining sleeve 140 can be formed as a single integral part of the same material. Alternatively, the retaining sleeve 140 can be manufactured as a separate part and then attached to the tapered body 130 of the crimping base 100. In this case, the retaining sleeve 140 can be made of the same metallic material as the crimping base 100 or of a different material. Preferably, the retaining sleeve 140 is made of metal material, while the tapered body 130, the neck 120, and the fastener can be made of metal or plastic.

Figure 3:
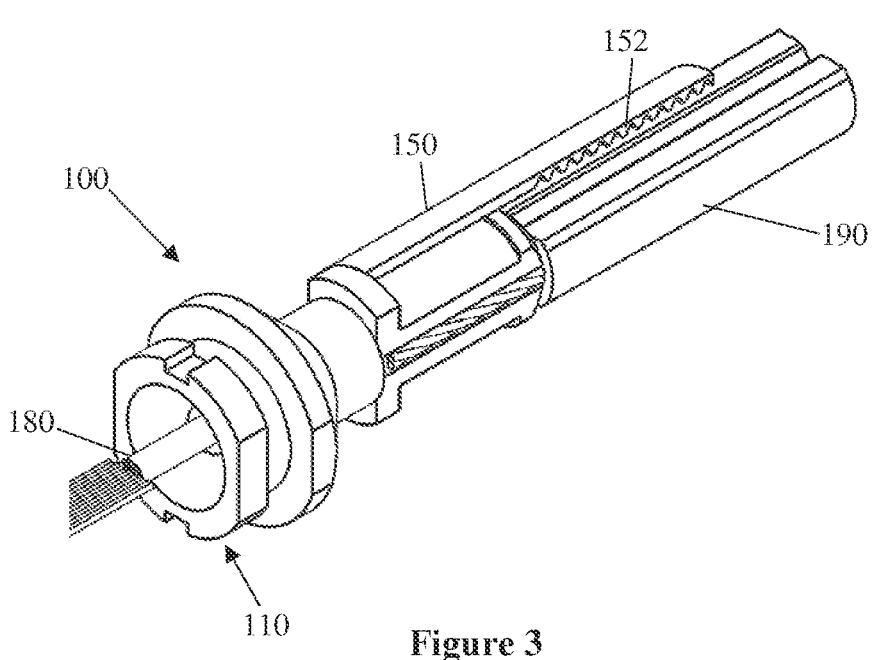
FIG. 3 illustrates a crimping base and a crimping ring according to an embodiment of the present invention.

The retaining sleeve 140 comprises a shoulder 142 to improve the positioning of a crimping ring 150 and prevent slippage. FIG. 3 illustrates the crimping base 100 with an optical cable 190 installed in its central hole and the crimping ring 150 (here illustrated in section to view its internal details) installed over the retaining sleeve 140. The crimping ring 150 has a longer length than the retaining sleeve 140 so that one region is positioned in contact with the retaining sleeve 140 near the shoulder 142 and the other region in direct contact with the sleeve 190 of the optical cable 180. Preferably, the crimping ring 150 comprises internal threads 152 positioned in the region in contact with the optical cable 190 to increase the adhesion of the assembly to the cable jacket. Alternatively, elements can be used to improve the adhesion with the optical cable such as roughnesses, grooves or other forms of relief applied on the inner surface of the crimping ring 150.

FIG. 4.*a* illustrates an inner body 200 formed by a substantially cylindrical and hollow body to allow the passage of fibers and bolts during the connectorization process and thus house an optical cable. In addition, the inner body 200 is long enough to allow the fiber to bend and move during dimensional variations caused by weathering, thus avoiding the accumulation of tension in the fibers. The inner body 200 comprises at one front end a 240*a* plug holder for connection of a single fiber optic connector plug. In addition, the inner body 200 comprises a gripping region 210 opposite the plug retainer 240*a*, which is arranged to fit the crimping base 100.

The gripping region 210 presents an opening so that its cross section has a C shape for the positioning of the crimping base 100. In addition, a mating surface 211 is provided for attachment of the fastener 110. The mating surface 211 is shaped correspondingly to the fastener 110 of the crimping base 100 for mating. Preferably, the engaging surface 211 is an angular fit formed by a projection on the inner part gripping region 210, extending radially inward. Alternatively, the mating surface 211 can be formed as a recess or gap that extends radially outward into the inner region of the inner body 200.

According to this embodiment of the present invention, the mating surface 211 has an arc shape having a length and width corresponding to the mating edge 111*a* and side faces, having an equal angulation, for the attachment of the side mating faces 113*a*, 113*b* of the fastener 110 of the crimping base 100. Thus, for connectorization of the assembly, the crimping base 100 is positioned above the opening of the gripping region 210 and moved to meet the mating surface 211 for attachment of the internal optical cable connector assembly 10.

Preferably, the mating surface 211 may further comprise a projection (not shown) in the central part of the arc corresponding to the notch 112*a* of the fastener 110 to improve the attachment of the crimping base 100 to the inner body 200.

Optionally, at the edge of the gripping region 210, a protrusion 214 is provided that has a C-shaped cross-section that extends beyond the mating surface 211 forming an opening 212 so as to provide a spacing for passage of the fastener 110. Preferably, the protrusion 214 extends radially inward having a thickness greater than the thickness of the mating surface 211. Also, the width of the protrusion 214 corresponds to the width of the neck 120 of the crimping base 100. Thus, when the crimping base 100 is mated to the inner body 200, the opening 212 guides the fastener over the mating surface 211 and the protrusion 214 provides an additional recess improving the hold and robustness of the reinforced optical cable connector assembly 10.

Preferably, the inner body 200 has an opening along its entire length having a variable C-shaped cross section. Preferably, the cross-section of the inner body 200 has a constant dimension from the gripping region 210 to approximately half the length of the inner body 200, where there is an intermediate angular region 220 whose cross-section gradually reduces to a semi-circular shape. Preferably, this semi-circular portion 230 forms a half-round opening that extends steadily to the end with plug fasteners 240*a*. This opening is provided to facilitate the connectorization process, including the fiber optic connector manufacturing process, where the fiber optic is inserted up to the 240*a* plug holder. In addition, the opening of the 200 internal body provides more space for accommodating the optical fibers, respecting their curvature radius, and avoiding attenuation problems when exposed to bad weather.

The inner body 200 comprises an end with plug holder 240*a* for fixing a corresponding connection standard plug. According to the illustrated embodiment, the 241*a* connection plug used is a Standard Connector (SC) plug that is attached and fixed to the 240*a* plug holder, as seen in FIG. 4.*b*.

FIG. 5.*a* shows an inner body 200, like that illustrated in FIGS. 4.*a* and 4.*b*, but differing in that it features a plug fastener 240*b* for fastening a Multi-fiber Push On (MPO) standard plug 241*b* that is used for fiber optic cables comprising multiple optical fibers 12 or 24 optical fibers. The 241*b* connection plug is plugged into the 240*b* plug holder.

Thus, the present invention enables the use of a reinforced connector for both monofiber and multifiber optical fibers as seen in the embodiments illustrated in FIGS. 4.*a* to 5.*b* with SC or MPO standard plugs. However, as will be evident to a person skilled in the art, the present invention is not limited to these shown standards, and different connector plug standards could be used such as FC, LC, LC duplex, ST, SN, CS, MTP, MT, MDC connectors, among others.

Figure 6:
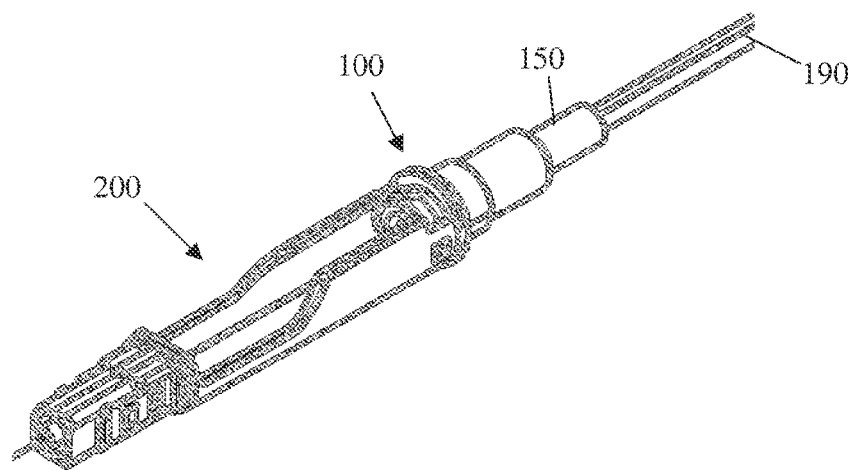
FIG. 6 illustrates an internal assembly according to an embodiment of the present invention.

FIG. 6 illustrates the assembly formed by the crimping base 100 attached to the inner body 200 where the monofiber type optical cable 190 is installed with an SC type connector as shown in FIG. 5.*b*. In addition, FIG. 6 shows the crimping ring 150 integrally around the retaining sleeve 140 and the optical cable cover 190.

Figure 7:
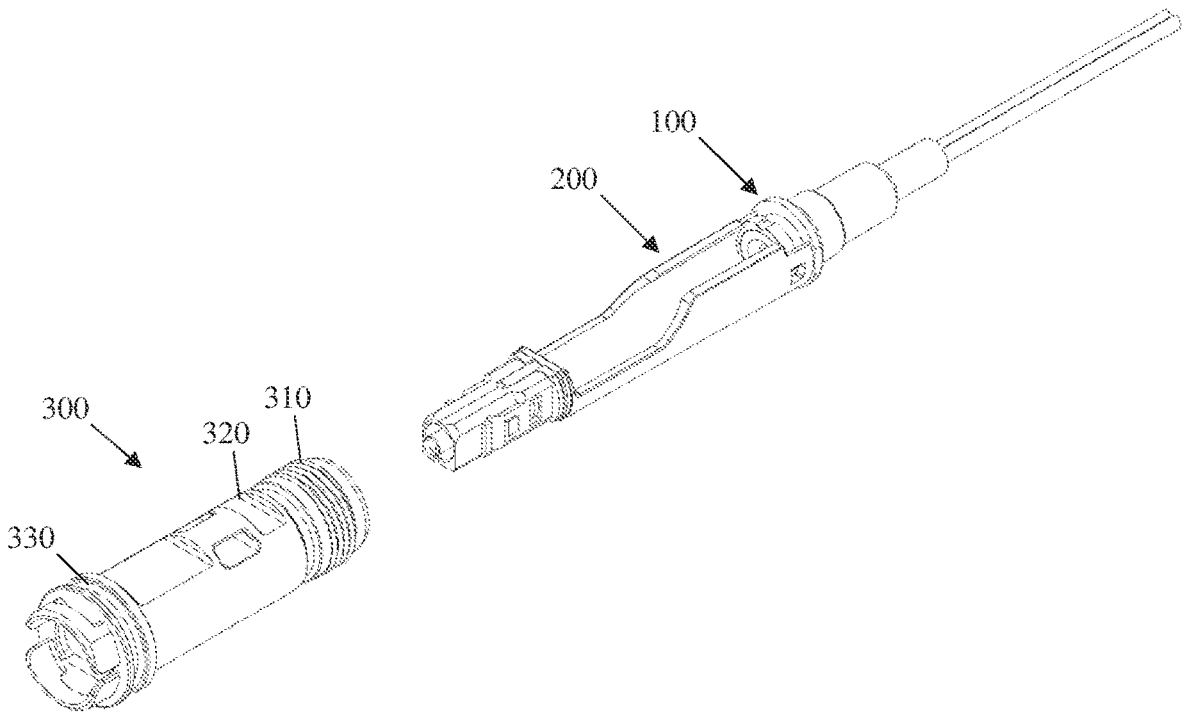
FIG. 7 illustrates the internal assembly and a reinforced body according to an embodiment of the present invention.

FIG. 7 illustrates a reinforced body 300 formed by a substantially cylindrical, hollow body to overlap the inner assembly of the crimping base 100 and the inner body 200. Preferably, the reinforced body 300 comprises a recess that enables the fitting of a Radio Frequency Identification (RFID) tag to locate, identify, track, inventory control, or operate as an anti-theft element in a Software as a Service (SaaS) platform.

Figure 8:
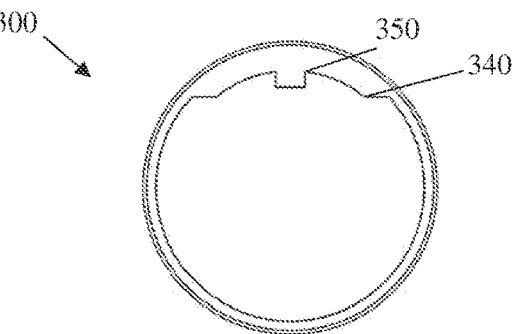
FIG. 8 illustrates a rear view of the reinforced body according to an embodiment of the present invention.

Preferably, the reinforced body 300 has internally a mating surface shaped corresponding to the top of the fastener 110. FIG. 8 illustrates a rear view of the reinforced body 300 showing in detail its internal part. In this embodiment, the reinforced body 300 has an arc-shaped channel 340 corresponding to the fitting edge 111*b* of the fastener 110. Optionally, a guide feature 350 can be positioned in channel 340 near the end of the reinforced body 300. In this way, the channel 340 and the guide feature 350 allow the assembly to be carried out only in one direction, so that the side openings 141 are in a horizontal position, maintaining the same direction of the optical cable for its correct positioning in the connection plug 241*a*, 241*b*.

Figure 9:
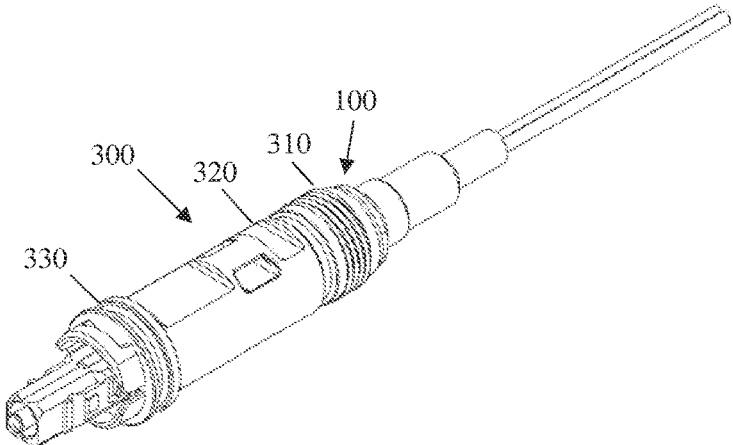
FIG. 9 illustrates the reinforced body on the internal assembly according to an embodiment of the present invention.

The reinforced body 300 is fitted into the end of the crimping base 100 forming an assembly as illustrated in FIG. 9.

Figure 10:
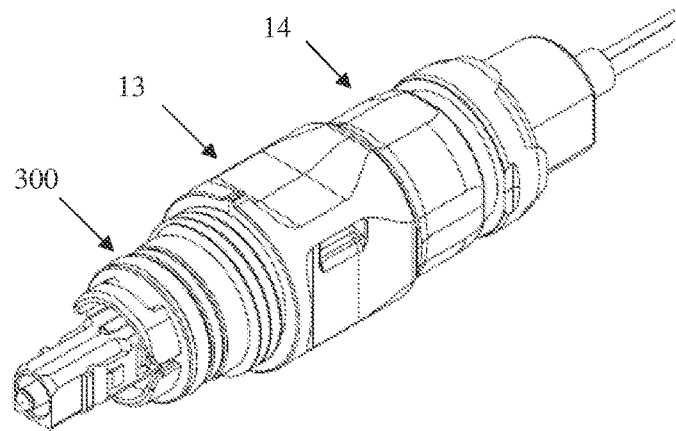
FIG. 10 illustrates the assembly of FIG. 9 with a cable gland according to an embodiment of the present invention.

On its outside, the reinforced body 300 comprises a rear thread 310 for fitting and attaching a cable gland. As seen in FIG. 10, cable gland 14 is threaded over back thread 310 of outer body 300 of fiber optic connector assembly 10. In addition, the reinforced body 300 has a shoulder 320 for fixing the outer housing 13, which has a self-locking part. At the end near the connection plug, the reinforced body 300 features a 330 thread for the attachment of a compatibility ferrule 11, 12. Thus, the fiber optic connector 10 is then assembled according to the configuration shown in the exemplary embodiments in FIGS. 1.*a* and 1.*b*.

Thus, the present invention provides a reinforced optical cable connector that presents a set with greater robustness provided by the crimping base coupled to the inner body. In addition, according to the embodiment described, the present invention enables the installation to be carried out in a practical and simple manner, and consequently faster.

Figure 11:
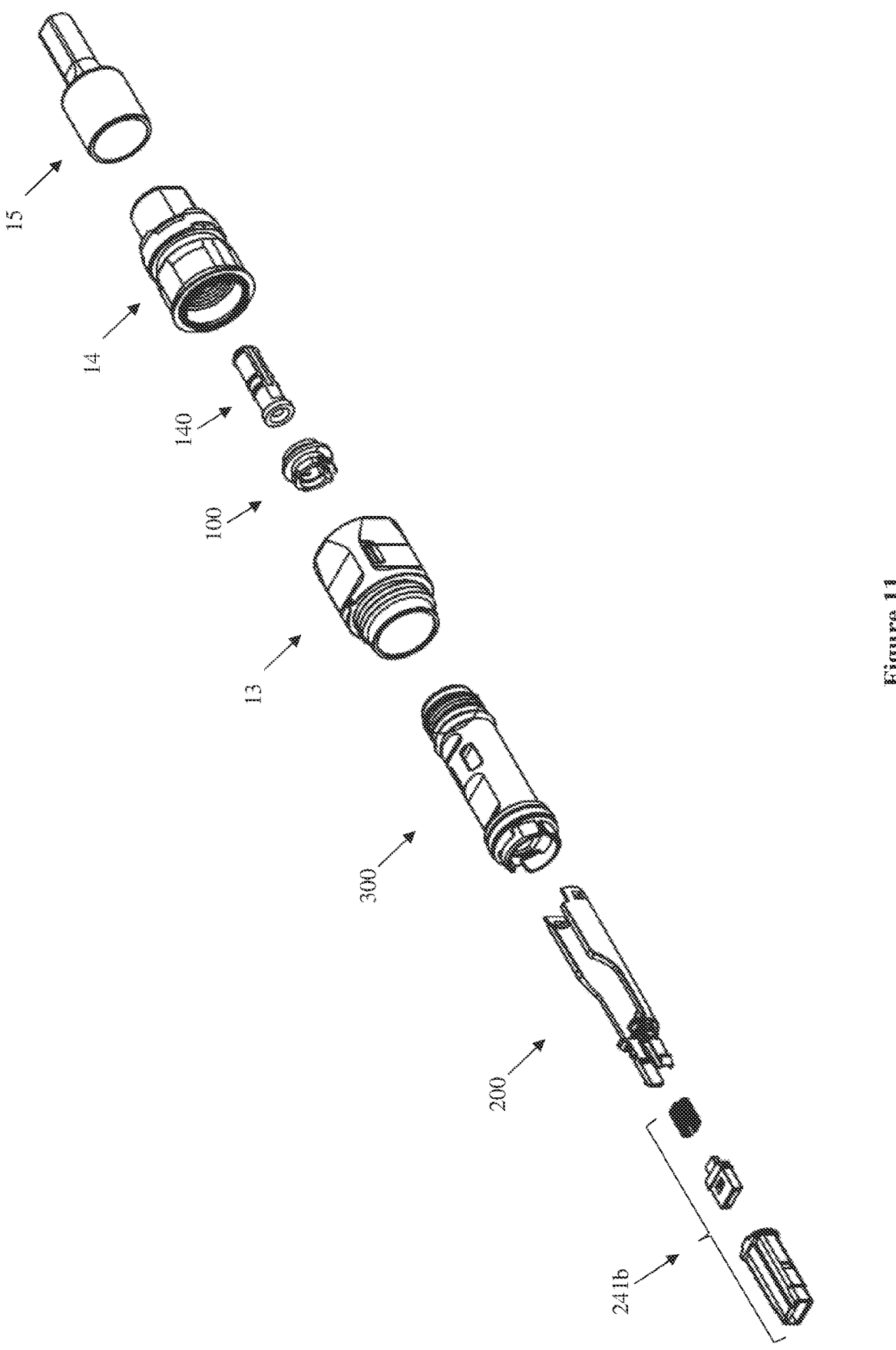
FIGS. 11 and 12 show exploded views of a reinforced optical cable connector according to another embodiment of the present invention.
Figure 12:
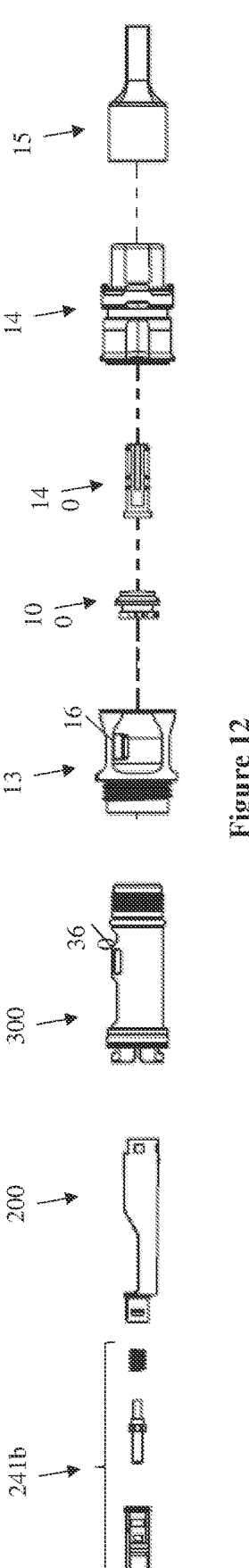

However, the present invention is not limited to this embodiment. FIGS. 11 and 12 show exploded views of a reinforced optical cable connector according to the present invention. This embodiment is similar to that shown in FIGS. 1 to 10, and therefore the same reference signals will be used to indicate elements of the same function.

According to this further embodiment of the present invention, the reinforced optical cable connector 10 comprises a crimping base 100, an inner body 200, a reinforced body 300, an outer housing 13, a cable gland 14, and an optical fiber connector plug 241*a*. In the illustrative example, the connector used is of the MPO standard for a multifiber cable, however, other connector standards such as SC, FC, LC, ST, MTP, among others, or, fiber types, such as multifiber, can be used within the scope of the present invention.

The outer elements of the reinforced optical cable connector assembly 10 are connected and attached in a manner similar to that shown in the first embodiment. Thus, the optical cable is inserted into the crimping base 100 and secured in the retaining sleeve 140. The crimping base 100 is engaged with the inner body 200 such that the optical fiber is positioned in the connector plug fastener. Connection plug 241*b*, shown here in its disassembled form, has its spring, bolt, and plug installed adjacent to inner body 200. On this inner assembly, the reinforced body 300 is positioned to allow the outer housing 13 and cable gland 14 to be attached. Additionally, a tail protector 15, preferably a heat shrinkable element, is positioned next to the cable gland to provide versatility for variations in cable diameter and geometry, and to provide strength to the assembly when subjected to angled or bending loads.

In this embodiment, the reinforced optical cable connector 10 may further comprise a locking feature by means of clamps. As seen in FIG. 12, the locking feature is formed by means of a hole 360 positioned preferably at the top of the reinforced body 300 and a hole 16 at the top of the outer housing 13. When the reinforced body 300 and the outer housing 13 are connected, the holes 360 and 16 are aligned. To accomplish locking of the reinforced body 300 and outer housing 13, a clamp (not shown) can be positioned through the holes 360 and 16 aligned during connectorization of connector 10. The clamp, which is preferably made of plastic material, is then tightened to provide additional locking of the assembly.

Figure 13:
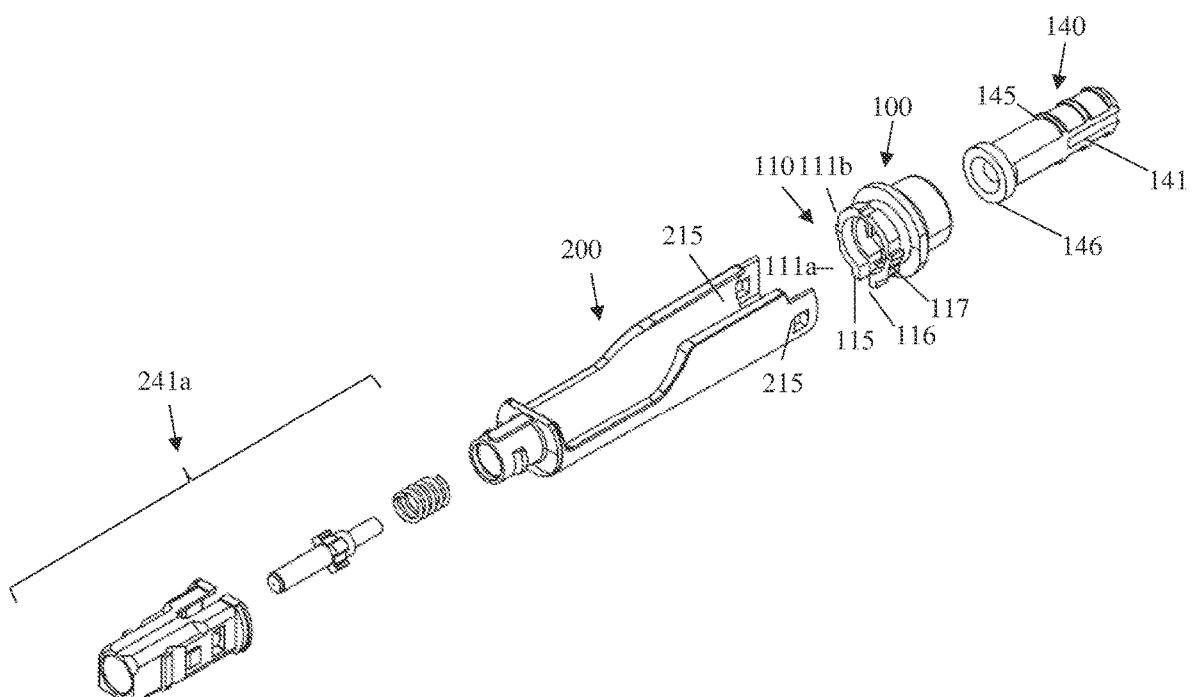
FIG. 13 illustrates in detail the internal body and crimping base according to another embodiment of the present invention.

However, as can be seen in detail in FIG. 13 the crimping base 100 is formed in two parts, so that the retaining sleeve 140 is a separate part. In this way, the retaining sleeve 140 is then connected and secured within the crimping base 100. As already mentioned, the crimping base 100 and the retaining sleeve 140 can be made of the same metallic material, or the retaining sleeve 140 can be made of a different polymeric material. Preferably, the retaining sleeve 140 is made of metal material, while the tapered body 130, the neck 120, and the fastener can be made of metal or plastic. However, as will become apparent, the present invention is not restricted to any specific material and one skilled in the art will understand that different materials suitable for accommodating optical fibers can be used.

The retaining sleeve 140 comprises side openings 141 for attaching optical cable pulling elements. In this embodiment, the retaining sleeve (140) has a rib 145 for positioning the tapered body of the crimping base 100. In addition, the retaining sleeve 140 has a lip 146 for its attachment inside the crimping base 100.

The crimping base 100 comprises a tapered body 130 and a fastener 110 for fitting into the inner body 200.

Figure 14:
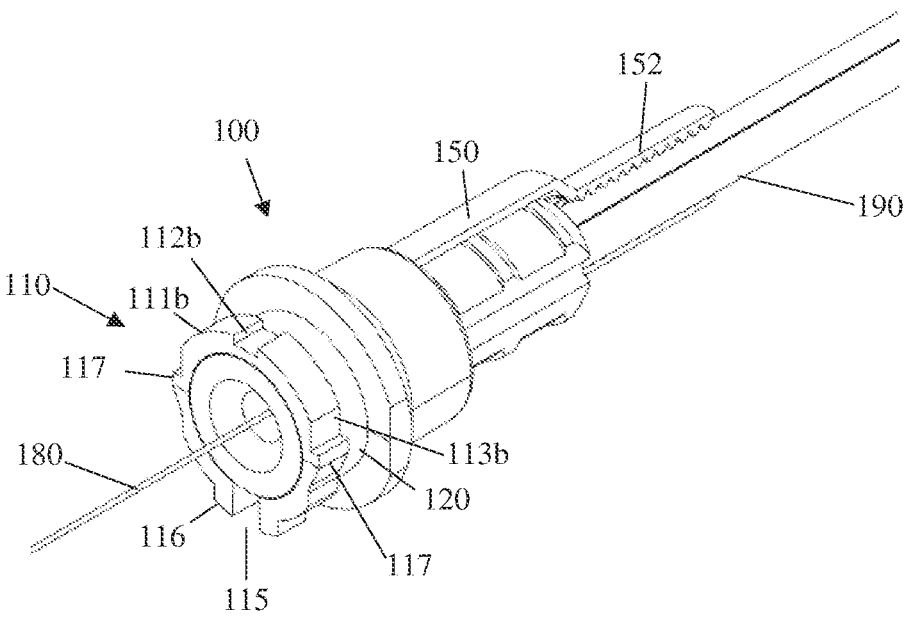
FIG. 14 illustrates a crimping base according to another embodiment of the present invention.

In this other embodiment, the fastener 110 also features two arc-shaped snap-on edges 111*a*, 111*b*. As seen in FIG. 14, preferably, in the central region of the lower fitting edge 111*a* a slot 115 is provided. At the ends near the slot 115, the fastener 110 has lower attachment teeth 116. In addition, on the side faces of the fastener 110 side clamping teeth 117 are provided.

The inner body 200, according to this embodiment of the present invention, has an mating surface for the fastener 110 of the crimping base 100. This mating surface is formed by an unevenness inside the inner body 200. Further, the gripping region comprises holes 215 arranged for engagement with the lower clamping teeth 116 and side clamping teeth 117 of the fastener 110.

Figure 15:
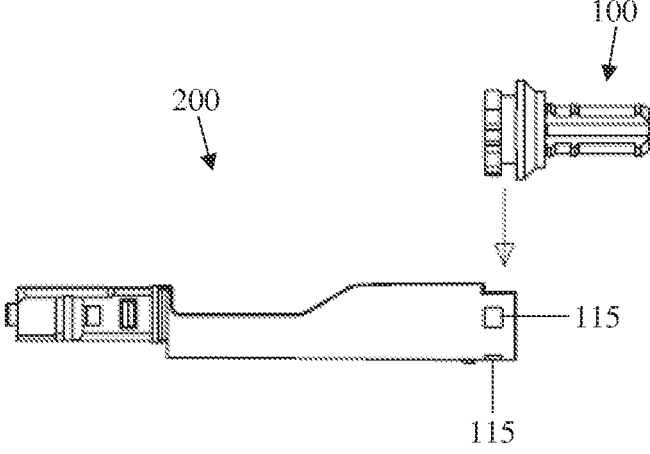
FIG. 15 illustrates in detail the internal body and crimping base according to another embodiment of the present invention.
Figure 16:
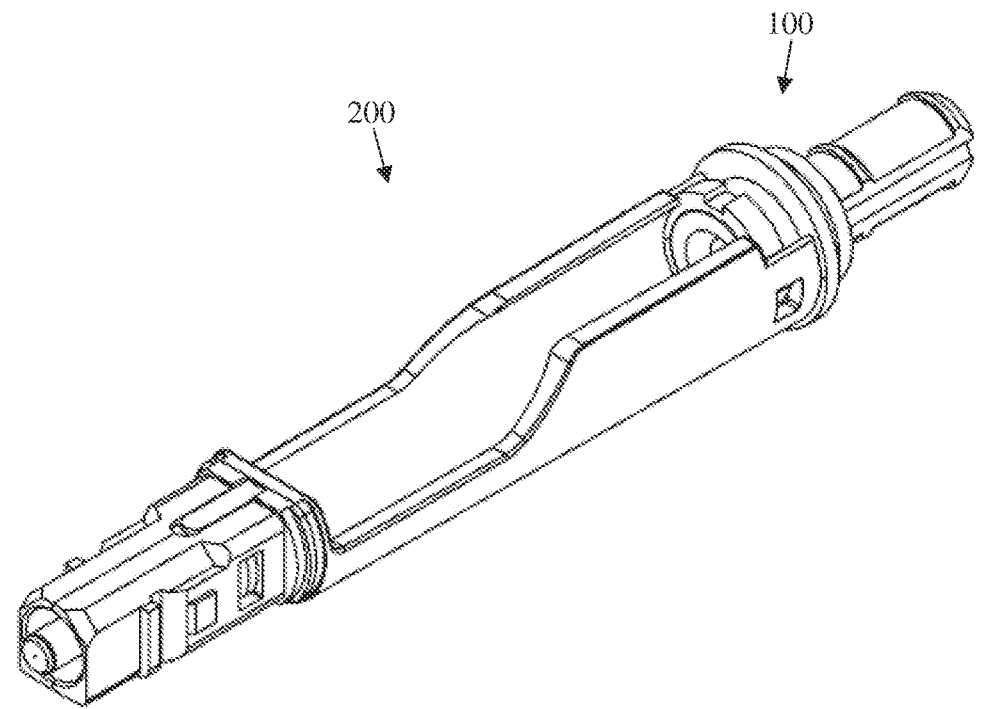
FIG. 16 illustrates in detail the crimping base attached to the inner body according to another embodiment of the present invention.

Accordingly, as illustrated in FIG. 15, for connectorization of the assembly, the crimping base 100 is positioned above the opening of the gripping region 210 and moved to meet the mating surface 211 for attachment of the internal optical cable connector assembly. FIG. 16 shows the assembly formed by the crimping base 100 attached by means of its clamping teeth 116, 117 to the holes 215 of the inner body 200.

Thus, the present invention provides a reinforced optical cable connector with greater robustness with a crimping base with better cable fixation and that can be installed in an agile and practical way.

The present invention is further advantageous in that it provides a reinforced optical cable connector that allows the installation to be carried out in a more practical and simple manner and, consequently, faster.

Numerous variations falling within the protective scope of the present invention are allowed. Thus, it is reinforced that the present invention is not limited to the particular configurations or embodiments described above.

The invention claimed is:

1. A reinforced optical cable connector comprising:
an inner body for housing an optical cable comprising at least one optical fiber, the inner body comprising a plug holder for securing a connection plug at a first end;
a crimping base comprising a retaining sleeve for retaining the optical cable; and
an outer housing to house the inner body and the crimping base;
wherein the inner body comprises a gripping region at a second end opposite the first end, the gripping region having a C-shaped cross section forming an opening for passage of a fastener;
wherein the crimping base comprises the fastener for fitting into the inner body; through the opening, the fastener comprising an arc-shaped lower fitting edge having a slot in a central region thereof, lower fastening teeth provided on ends adjacent to the slot, and side fastening teeth provided on side faces of the fastener;
wherein the gripping region comprises a mating surface and holes arranged for engagement with the lower fastening teeth and the side fastening teeth for securing the fastener of the crimping base;
wherein a protrusion is provided on an edge of the gripping region extending radially inward and having a thickness greater than a thickness of the mating surface; and
wherein the opening guides the fastener over the mating surface and the protrusion for fitting.

2. The reinforced optical cable connector according to claim 1, wherein the fastener comprises an arc-shaped bottom fitting edge and side fitting faces; and
the mating surface has a shape corresponding to the fastener.

3. The reinforced optical cable connector according to claim 2, wherein the mating surface has an arc shape having length and width corresponding to the arc-shaped lower fitting edge and side faces, having an equal angulation, for securing the side fitting faces of the fastener of the crimping base.

4. The reinforced optical cable connector according to claim 3, wherein the lower fitting edge comprises a notch and the mating surface-comprises a projection for fixing the notch.

5. The reinforced optical cable connector according to claim 1, wherein the crimping base has a conical body, the fastener, and a neck-formed between them.

6. The reinforced optical cable connector according to claim 1, wherein the fastener comprises an upper fitting edge-.

7. The reinforced optical cable connector according to claim 6,
wherein the upper fitting edge comprises a notch for fixing a reinforced body, and the reinforced body comprises an arc-shaped channel and a guide feature for engaging the notch.

8. The reinforced optical cable connector according to claim 7, wherein the reinforced body comprises fixing elements for fixing the external housing.

9. The reinforced optical cable connector according to claim 7, wherein the reinforced body comprises a hole and the outer housing comprises a locking hole, in which the locking holes and the locking hole are aligned when the outer housing is fixed in the reinforced body, and
a clamp attached to the locking hole to lock the outer housing.

10. The reinforced optical cable connector according to claim 7, wherein the reinforced body comprises a recess for fitting a tag with a radio frequency identifier.

11. The reinforced optical cable connector according to claim 7, wherein the outer housing is fitted over the reinforced body, in which the outer housing comprises at one end fastening elements for coupling a cable gland and at the other end fastening elements for coupling a protection ferrule.

12. The reinforced optical cable connector according to claim 11, wherein a tail protector is positioned next to the cable gland to provide versatility of cable diameter and geometry variations, in which the tail protector is preferably a heat shrinkable element.

13. The reinforced optical cable connector according to claim 1, wherein the cable retaining sleeve comprises side openings for fixing optical cable traction elements and a shoulder for positioning a crimping ring.

14. The reinforced optical cable connector, according to claim 13, wherein the crimping ring has a greater length than the retaining sleeve so that a region is positioned in contact with the retaining sleeve next to the shoulder and the other region in direct contact with a cover of the optical cable comprises internal threads for adherence with the optical cable.

15. The reinforced optical cable connector according to claim 1, wherein the retaining sleeve is a separate part of the crimping base.

16. The reinforced optical cable connector according to claim 15, wherein the retaining sleeve has a rib for positioning a conical body of the crimping base; and the retaining sleeve has a flange for its attachment within the crimping base.

17. The reinforced optical cable connector according to claim 1, wherein the gripping region has a constant C-shaped cross section.

18. The reinforced optical cable connector according to claim 1, wherein the inner body comprises an angled portion having a cross-section in C that gradually reduces; and a semicircular portion with semicircular cross section.

19. The reinforced optical cable connector according to claim 1, wherein the optical cable is a monofiber cable and the connection plug is of the SC type.

20. The reinforced connector according to claim 1, wherein the optical cable is a multifiber cable and the connection plug is of the MPO type.

21. The reinforced optical cable connector according to claim 1, wherein the optical cable is a hybrid cable comprising an electrical conductor.

22. The reinforced optical cable connector according to claim 1, wherein the arc-shaped lower fitting edge further comprises a notch, and the mating surface comprises a projection configured to engage and fix the notch.

23. The reinforced optical cable connector according to claim 1, wherein the fastener further comprises an upper fitting edge having a notch for fixing a reinforced body, and the reinforced body comprises an arc-shaped channel and a guide feature for engaging the notch of the upper fitting edge.

24. The reinforced optical cable connector according to claim 1, wherein the crimping base comprises a conical body, the fastener, and a neck formed between the conical body and the fastener.

* * * * *